June 18, 1957 W. M. MILLER 2,795,915
LAWN EDGER
Filed Sept. 2, 1954 2 Sheets-Sheet 1
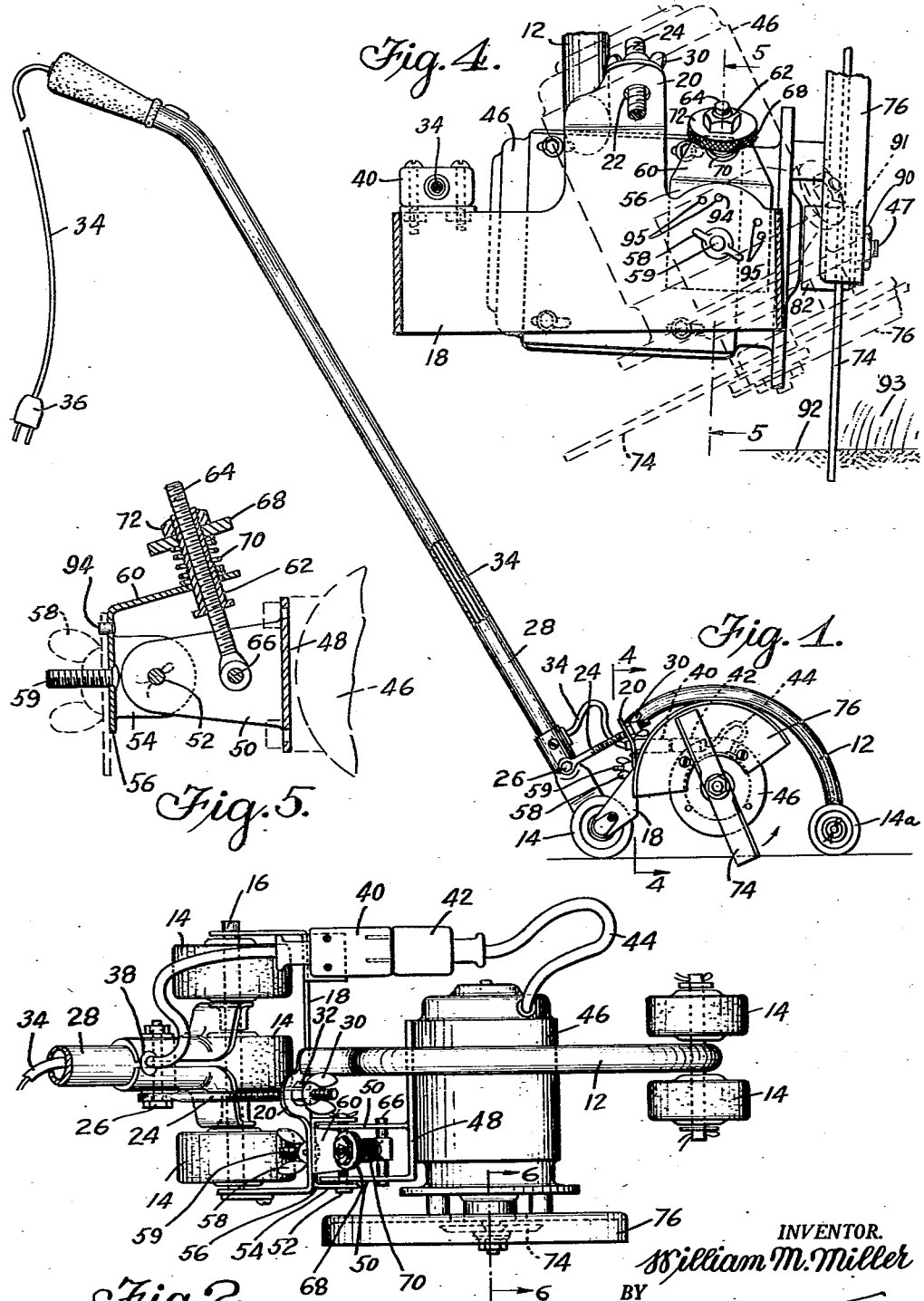
INVENTOR.
William M. Miller
BY
Albert J. Fihe
ATTORNEY

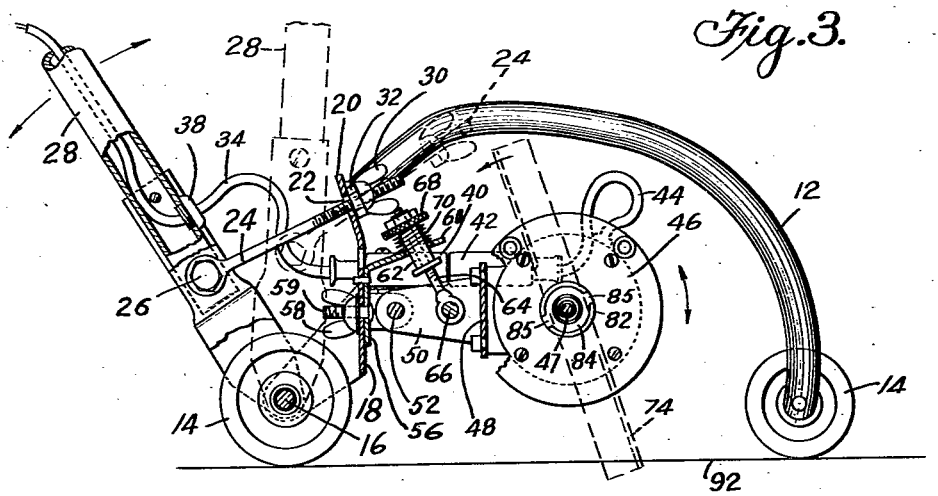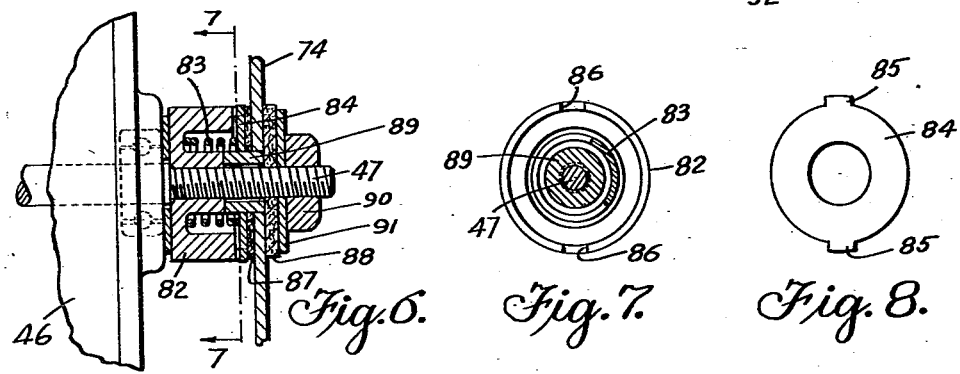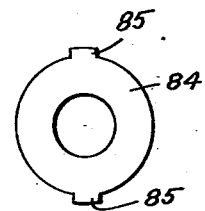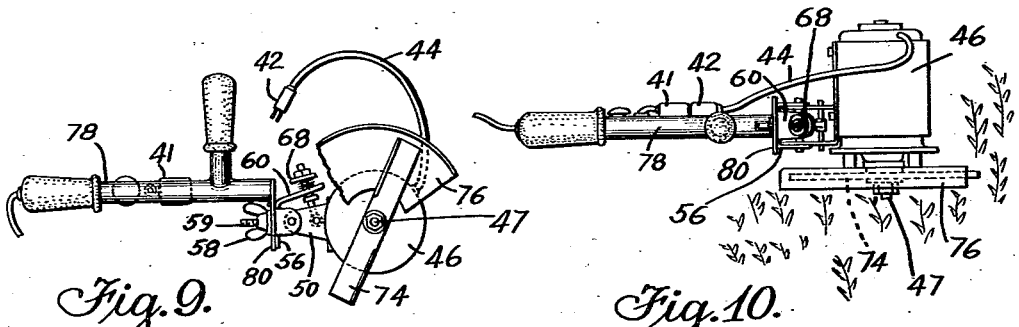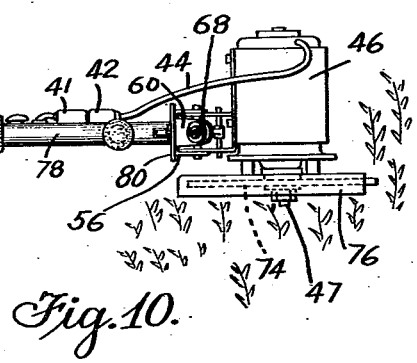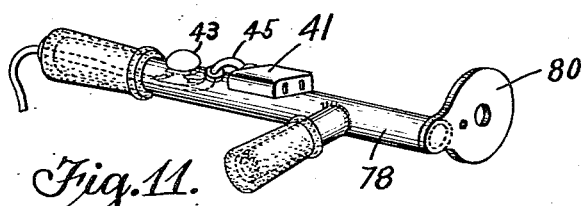

United States Patent Office 2,795,915
Patented June 18, 1957

2,795,915
LAWN EDGER

William M. Miller, North Hollywood, Calif., assignor to Lawn Barber Corporation, North Hollywood, Calif., a corporation of California Application September 2, 1954, Serial No. 453,801

2 Claims. (Cl. 56—25.4)

This invention relates to an improved lawn edger and has for one of its principal objects the provision of a device of the class described which will enable the easy, simple and efficient trimming of grass and other portions of lawns which are close to the edge of a walk or wall.

One of the important objects of the invention is to provide a cutter blade for the grass or other material which is adjustable as to height above the walk or lawn.

A further object of the invention is the provision in a lawn edger of a clutch element whereby the driving power to the cutting blade is automatically disconnected when the same strikes an obstacle such as a stone or similar object.

Still another object of the invention is to provide means for manually adjusting the cutting angle of the blade itself, thereby making the device adaptable for use in many and varied environments.

Yet another object of the invention is the provision in a motor driven lawn edger or the like of means for readily removing the motor and its cutter blade from its travelling supporting frame, whereby the same may be conveniently used for trimming hedges and the like.

A further object of the present invention is to provide a lawn edge trimmer which is small and compact in structure and which can be conveniently manipulated to quickly and readily trim the edges of a lawn adjacent the walk thereof.

A still further purpose of the present invention is to provide a lawn edger of the character described which is simple and practical in construction, strong and reliable in use, neat and attractive in appearance, relatively inexpensive to manufacture and otherwise well adapted for the purposes for which the same is intended.

Another and still further important object of the invention is the provision in a lawn edger of a cutting blade and motor therefor, which elements are so mounted on the frame of the device that the same will automatically adjust to ground level variations and other obstructions whenever encountered.

Another object is to provide a cutter, edger and trimmer which may be manipulated with one hand, which will easily ride upon rollers supporting the same on the ground or a walk, and wherein the operating handle is adjustable for the convenience of the user.

Other and further important objects of the invention will be apparent from the disclosures in the accompanying drawings and following specification.

The invention, in a preferred form, is illustrated in the drawings and hereinafter more fully described.

In the drawings:

Figure 1 is a side elevation of the improved lawn edger of this invention showing more particularly the handle, the supporting wheels and frame and the cutter blade and motor with parts broken away and shown in section.

Figure 2 is an enlarged top view of the device with the handle removed and illustrating in more detail the adjustable resilient and removable mounting of the motor and associated parts.

Figure 3 is an enlarged side elevation of the frame, motor and a portion of the handle showing the adjustability of the handle and the resilient mounting of the motor and blade with parts broken away and shown in section.

Figure 4 is an enlarged detail view partly in section taken on the line 4—4 of Figure 1, illustrating the angular adjustment for the motor and cutting blade.

Figure 5 is an enlarged detail of the cushion mounting for the motor taken on the line 5—5 of Figure 4.

Figure 6 is an enlarged sectional view of the slip-clutch drive for the blade and is on the line 6—6 of Figure 2.

Figure 7 is a section taken on the line 7—7 of Figure 6, looking in the direction indicated by the arrows.

Figure 8 is a plan view of one of the clutch plates.

Figure 9 illustrates the motor and cutter blade as removed from the ground contacting frame and fitted on to a handle for hedge trimming purposes and the like.

Figure 10 is another view of the construction of Figure 9 illustrating an additional feature.

Figure 11 is a perspective of the removable supporting handle for the motor and blade when used apart from the roller supported frame.

As shown in the drawings:

The reference numeral 12 indicates generally the supporting frame of the improved lawn edger of this invention, which is shown as curved and tubular and which is preferably composed of metal. However, other shapes and materials may obviously be employed.

The frame 12 is mounted upon sets of rollers 14 and 14a and here again the construction can be considerably varied to meet requirements.

Fitted upon the rear axle 16 of the frame and support is a bracket 18 having an integral upward extension 20 to which one end of the frame 12 is fastened in any convenient manner, as by welding, rivets or the like.

The extension element 20 has an opening 22 therein (Figure 4), and a threaded shaft 24 is loosely fitted therein, one end of this shaft being pivotally connected at 26 to a point adjacent the lower end of the operating handle 28. The other end of the threaded shaft 24 has a winged nut 30 mounted thereon and also a lock nut 32 whereby the angular position of the handle 28 may be adjusted, as best shown in Figures 1 and 3, while at the same time allowing the handle to be freely moved upwardly and forwardly into the dotted line position shown in Figure 3.

The lower end of the handle is pivotally mounted on the axle 16 and the same is preferably hollow for the reception of the electric wire 34, and terminating in an extension and plug 36.

The wire is brought out of the lower end of the handle through a grommet 38 and terminates in a receptacle 40 mounted on the plate 18. This receptacle is adapted to movably receive a plug 42 (Figure 2) which provides one terminal of a short wire 44 leading to the motor 46. This enables a ready disconnection at this point.

A bracket 48 supports the motor 46 and this bracket has integral bifurcated extensions 50 which are pivotally connected by a pin 52 to corresponding bifurcations 54 of a plate 56 removably mounted on the bracket 18 by means of a winged nut 58 and bolt 59 (Figure 5).

The plate 56 has in addition to the integral ears 54 an upper extension 60 having an opening therethrough into which a sleeve or bushing 62 is loosely fitted (Figure 5).

This sleeve is interiorly and exteriorly screw-threaded and a threaded shaft 64 is fitted thereinto, the lower end of this shaft being pivotally mounted on a pin 66 passing through and fixed into openings in the bifurcations or ears 50 of the plate 48.

An adjusting nut 68 is mounted on the sleeve 62 and this surmounts a helical spring 70 also on the sleeve and surrounding the same, the lower end of the spring abutting the upper face of the extension plate 60 of the support 56. The adjusting nut 68 can be locked into a desired position by a lock nut 72. This arrangement provides a resilient mounting for the motor 46 and its attached cutting blade 74 whereby an upward movement of the motor and blade is permitted whenever the same strike an obstacle, and an adjustment of the operating height of the blade with respect to a sidewalk or lawn is likewise permitted.

A guard plate 76 is fitted on to the motor in protective relationship to the rotatable blade and the entire assembly of motor, blade and guard plate can be removed from the frame of the device by taking off the winged nut 58 and pulling the end 42 of the connecting current-carrying cord or wire 44 from its socket in the element 40. This assembly can then be fitted to any sort of a handle or other support 78 such as shown in Figures 9, 10 and 11, having an end plate 80 for receiving the bolt 59 upon which the winged nut 58 fits. Another current-carrying wire 45 having a plug receptacle 41 and a switch 43 is preferably mounted on the handle 78 so that a ready control of the motor can be had for hedge-clipping purposes or similar work, as best illustrated in Figure 10.

A slippable friction clutch is provided for the cutting blade 74, this comprising essentially a housing 82 mounted on the driving shaft 47 of the motor 46 (Figure 6). This housing is provided with a recess in which a helical spring 83 is fitted and which presses against a plate 84 forcing the same into a normal outer or forward position. This plate has two extensions or ears 85 (Figure 8), which fit into notches 86 in the outer peripheral face of the hub or casing 82, thereby preventing it from turning with respect to the case or housing. A friction disc 87 is positioned between the outer face of the element 84 and the hub portion of the blade 74, and a similar friction disc 88 contacts the outer face of the blade 74 adjacent its middle. The blade itself has an enlarged central opening into which is fitted a bushing 89 which slides freely on the shaft 47 and a nut 90 and washer 91 are fitted on the outer end of the shaft 47 to fasten the parts of the clutch and blade together. The tension on the spring 83 and the resultant frictional contact of the discs 87 and 88 against the central portion of the cutting blade 74 can be adjusted by means of the nut 90 whereby a pre-determined slippage of the blade 74 is provided in the event of the accidental contacting of the same with the edge of a pavement or the like. The pavement is indicated at 92 in Figures 1, 3 and 4 and the adjacent edge of the lawn is indicated at 93 in Figure 4. These figures show the approximate depth to which the cutting blade 74 is adjusted for usual operation when it does go below the ground level at times, if desired.

It will be evident that herein is provided a lawn edger which will eliminate a great deal of hand work in the trimming of lawns in that it can be simply moved along the adjacent edge of a pavement or a sidewalk with the motor in operation and a very satisfactory trimming job accomplished with little effort. The adjustable, resilient mounting of the motor and blade enables trimming to a pre-determined depth and eliminates the necessity of frequent stoppages due to the encountering of obstacles. This also eliminates practically all the possibilities of breakage. Any other possibilities of breakage are substantially completely removed by the friction or clutch mounting of the blade itself, and the handle can be adjusted to operating heights to suit almost any operator whether tall or short.

Additionally, the motor and blade with its guard can be completely removed from the wheeled support and mounted on the handle for other work such as hedge trimming and clipping of grass, weeds and the like in places which are ordinarily inaccessible, except perhaps with the hand shears.

Furthermore, the angle of operation of the blade can be adjusted by loosening the winged nut 58 and shifting the relationship of the motor and blade to the support frame 18 through various angles, as best shown in Figure 4. A short pin 94 (Figure 5), is fixed into the plate 56 and the projecting end of this pin is adapted to be fitted into any one of a series of openings 95 drilled into the plate 18, as best shown in Figure 4, whereby the angular adjustment of the motor and blade can be fixed without any possibility of the same accidentally changing by a slight loosening of the winged nut 58.

The device is particularly well adapted for use around curbings and under fences. It also works exceedingly well with regard to the edgings of portions of lawns around flower beds, trees, and shrubs. The blade 74 with its motor can be moved into an actual horizontal position, this movement being shown to some extent in Figure 4 and in this position or somewhat more of an angle from the vertical. For use on hills and slopes, the apparatus can be employed as a very efficient lawn mower, when the blade is horizontal, or nearly so.

A reference to the pivotal mounting of the handle 28, as shown in Figure 3 will demonstrate that the mower can be backed up and moved in very close to a building or other structure, which ordinarily prove to be very difficult obstacles in the way of providing a neat, and clean-cut appearance of adjacent portions of a lawn.

The slip clutch as best illustrated in Figure 6, will obviously prevent damage to the motor 46 if the blade does happen to encounter some non-severable object. In order to provide a desired slippage of the clutch, the nut 90 is always pulled down into a tight relationship with its adjacent parts. The spring 83 is so designed as to provide proper and necessary slippage when obstacles are encountered by the blade, while at the same time assuring of a proper cutting operation, with no slippage, so far as ordinary portions of lawn and similar severable elements are being worked upon.

In order to move the edger from place to place, the motor is usually stopped for safety, and in order to get the unit over connecting walks, up and down curbs or around corners the handle 28 is preferably tilted back and then pushed downwardly so that the weight is all on the rear wheels 14, enabling a ready and feasible transportation from place to place. The edger can be stored in a very small space when not in use, at which time the handle 28 is preferably moved into the position shown in the dash lines in Figure 3.

I am aware that many changes may be made and numerous details of construction varied throughout a wide range without departing from the principles of this invention, and I therefore do not purpose limiting the patent granted hereon otherwise than as necessitated by the prior art.

I claim as my invention:

1. A lawn edger comprising in combination a wheeled supporting framework, an operating handle pivotally and adjustably mounted on the framework, a motor removably mounted for up-and-down adjustment in the framework, a cutting blade on the motor shaft, a guard for the blade also on the framework, current-carrying wires for the motor, an adjustable cushioning support for the motor, the current-carrying wires for the motor extending through the operating handle and having a breakable connection, said breakable connection mounted on the framework adjacent the motor, the motor and blade being also angularly adjustably mounted in the frame, said angular adjustable mounting including two bifurcated brackets, a winged nut and bolt supporting one of the brackets in the framework, a projecting pin on one of the brackets, the framework having a series of circularly disposed openings therein adjacent the winged nut and bolt for fixing the adjusted angular relationship of the motor and blade with respect to the frame.

2. A lawn edger comprising in combination a wheeled supporting framework, an operating handle pivotally and adjustably mounted on the framework, a motor removably mounted for up-ond-down adjustment in the framework, a cutting blade on the motor shaft, a guard for the blade also on the framework, current-carrying wires for the motor, an adjustable cushioning support for the motor, the current-carrying wires for the motor extending through the operating handle and having a breakable connection, said breakable connection mounted on the framework adjacent the motor, the motor and blade being also angularly adjustably mounted in the frame, the removable cushioning support including a plate on which the motor is fixed, bifurcated extensions on the plate, a pin passing through the extensions, a threaded bolt having one end mounted on the pin for movement thereabout, a bracket adapted to be removably mounted on the supporting frame of the device, said bracket having bifurcations engaging the bifurcations of the motor support, a pin pivotally connecting the four bifurcations, an upper extension plate having an opening on the bracket, a screw-threaded sleeve mounted on the bolt, said sleeve passing through said opening in the extension plate, an adjusting nut screw-threadedly mounted on the sleeve and a helical spring surrounding the sleeve and positioned between the adjusting nut and the extension plate.

References Cited in the file of this patent

UNITED STATES PATENTS

| | | |
|---|---|---|
| 1,426,989 | Jones et al. | Aug. 22, 1922 |
| 2,404,504 | Klose | July 23, 1946 |
| 2,471,367 | Cavaness | May 24, 1949 |
| 2,539,619 | Goodall | Jan. 30, 1951 |
| 2,539,779 | Grosso | Jan. 30, 1951 |
| 2,556,790 | Berdan | June 12, 1951 |
| 2,561,293 | Ross | July 17, 1951 |
| 2,608,043 | Berdan | Aug. 26, 1952 |
| 2,651,530 | Blydenburgh | Sept. 8, 1953 |
| 2,707,362 | Thelander | May 3, 1955 |
| 2,726,524 | Gorin | Dec. 13, 1955 |